United States Patent [19]

Purcell

[11] Patent Number: 4,896,586
[45] Date of Patent: Jan. 30, 1990

[54] PISTON STOP ASSEMBLY

[75] Inventor: Robert J. Purcell, Washington, Ill.

[73] Assignee: Caterpillar Inc., Peoria, Ill.

[21] Appl. No.: 222,674

[22] Filed: Jul. 21, 1988

[51] Int. Cl.[4] .................................................. F15B 15/26
[52] U.S. Cl. ...................................... 92/21 MR; 92/15;
92/17; 188/269; 267/64.13
[58] Field of Search ................. 92/15, 17, 20, 21 MR,
92/22, 21 R, 23, 59, 193, 197, 198, 199, 200,
203, 207, 201, 205; 188/269, 265; 267/64.13

[56] References Cited

U.S. PATENT DOCUMENTS

| | | | |
|---|---|---|---|
| 91,010 | 6/1869 | Gates | 92/193 |
| 118,843 | 9/1871 | Clark | 92/193 |
| 1,335,951 | 4/1920 | Allen | 92/193 |
| 1,427,647 | 8/1922 | Sharp | 92/193 |
| 2,632,426 | 3/1953 | Geesink | 92/21 MR |
| 3,104,593 | 9/1963 | Clifton et al. | 92/21 MR |
| 3,128,089 | 4/1964 | Burris et al. | 267/64 |
| 3,168,302 | 2/1965 | Burris | 267/64 |
| 3,177,780 | 4/1965 | Anderson et al. | 92/21 |
| 3,180,234 | 4/1965 | Crawley et al. | 92/21 MR |
| 3,337,208 | 8/1967 | Johansson et al. | 267/64 |
| 3,343,832 | 9/1967 | Gustafsson | 267/64 |
| 3,398,492 | 8/1968 | Nansel | 92/23 |
| 3,410,549 | 11/1968 | Cheak | 267/64 |
| 3,456,940 | 7/1969 | Graef | 267/64 |
| 3,457,842 | 7/1969 | Tennis | 92/200 |
| 3,470,793 | 10/1969 | Hanchen | 92/20 |
| 3,752,498 | 8/1973 | Shea et al. | 280/124 F |
| 3,770,084 | 11/1973 | Hill | 92/17 |
| 3,792,910 | 2/1974 | Kaufman et al. | 305/10 |
| 3,913,459 | 10/1975 | Skreiner | 92/23 |
| 3,968,976 | 7/1976 | Sievenpiper | 280/709 |
| 4,106,596 | 8/1978 | Hausmann | 188/269 |

FOREIGN PATENT DOCUMENTS

| | | | |
|---|---|---|---|
| 2409721 | 4/1975 | Fed. Rep. of Germany | 92/23 |
| 2540402 | 3/1977 | Fed. Rep. of Germany | 92/15 |
| 588909 | 2/1959 | Italy | 92/193 |
| 0721566 | 3/1980 | U.S.S.R. | 92/17 |
| 1052744 | 11/1983 | U.S.S.R. | 92/15 |
| 468354 | 7/1937 | United Kingdom | 92/193 |

Primary Examiner—Edward K. Look
Assistant Examiner—Thomas Denion
Attorney, Agent, or Firm—Claude F. White

[57] ABSTRACT

An assembly for stopping and retaining a floating piston within a closed cylinder includes a plurality of retaining ring segments which are seated within a groove provided in the internal wall of the cylinder. The retaining ring segments are held securely in place by a plurality of retaining plates which are clamped together by a plurality of threaded fasteners. The assembly is positioned deep within the cylinder at a specific location by a special tool. This tool also activates portions of the stop assembly to initially seat the retaining ring segments in the groove. A floating piston and associated seals are used in a combination oil and gas cylinder to separate the pressurized oil chamber from the compressed gas chamber. In order to maintain the piston in the cylinder while one chamber is evacuated and the other chamber remains pressurized, a piston stop and retainer assembly is required. It is advantageous to provide such a stop assembly entirely on the internal walls of the cylinder and in the central portion of the cylinder. The subject stop assembly is a compact and reliable mechanism for maintaining a floating sealing piston within a two chamber cylinder.

13 Claims, 5 Drawing Sheets

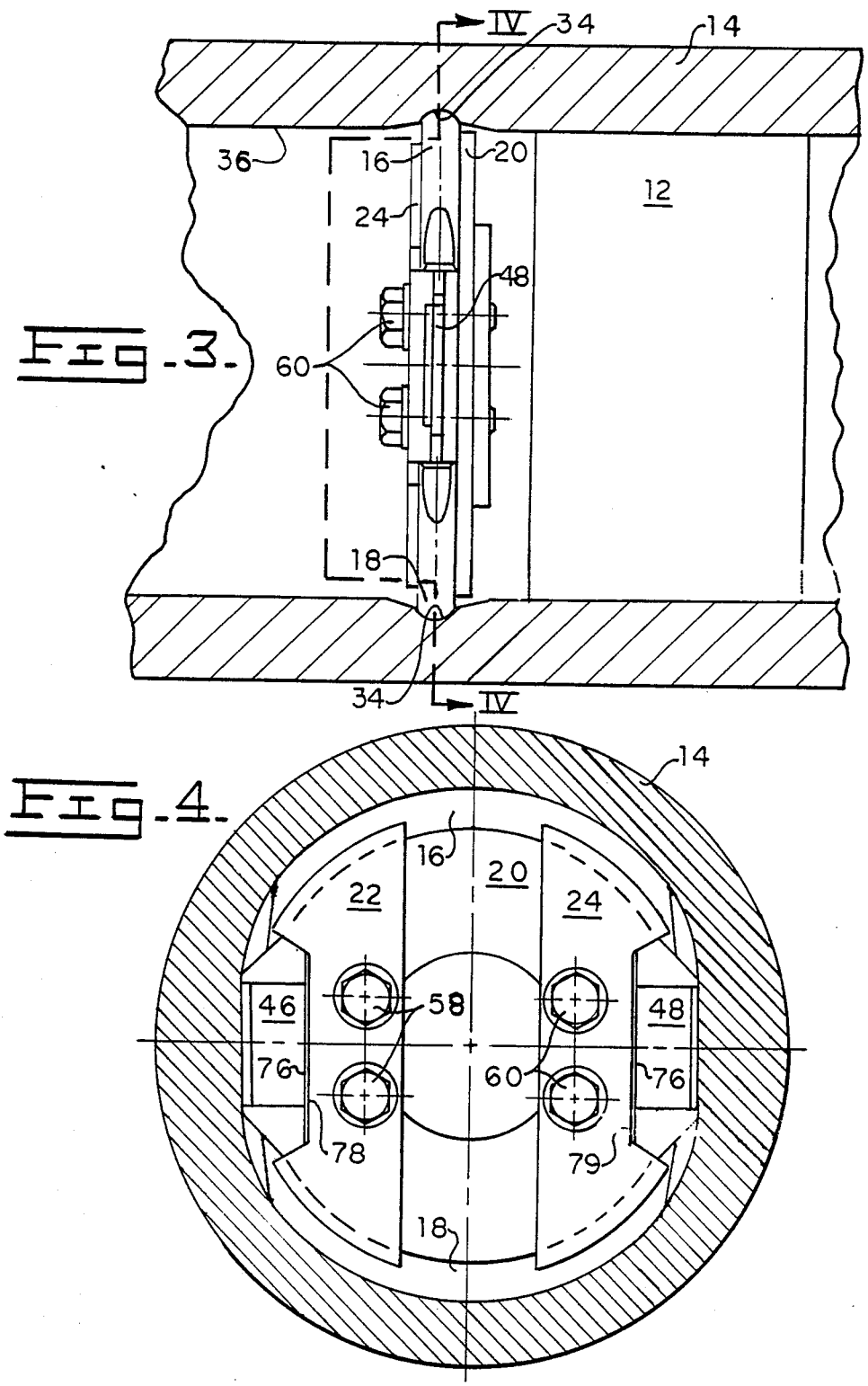

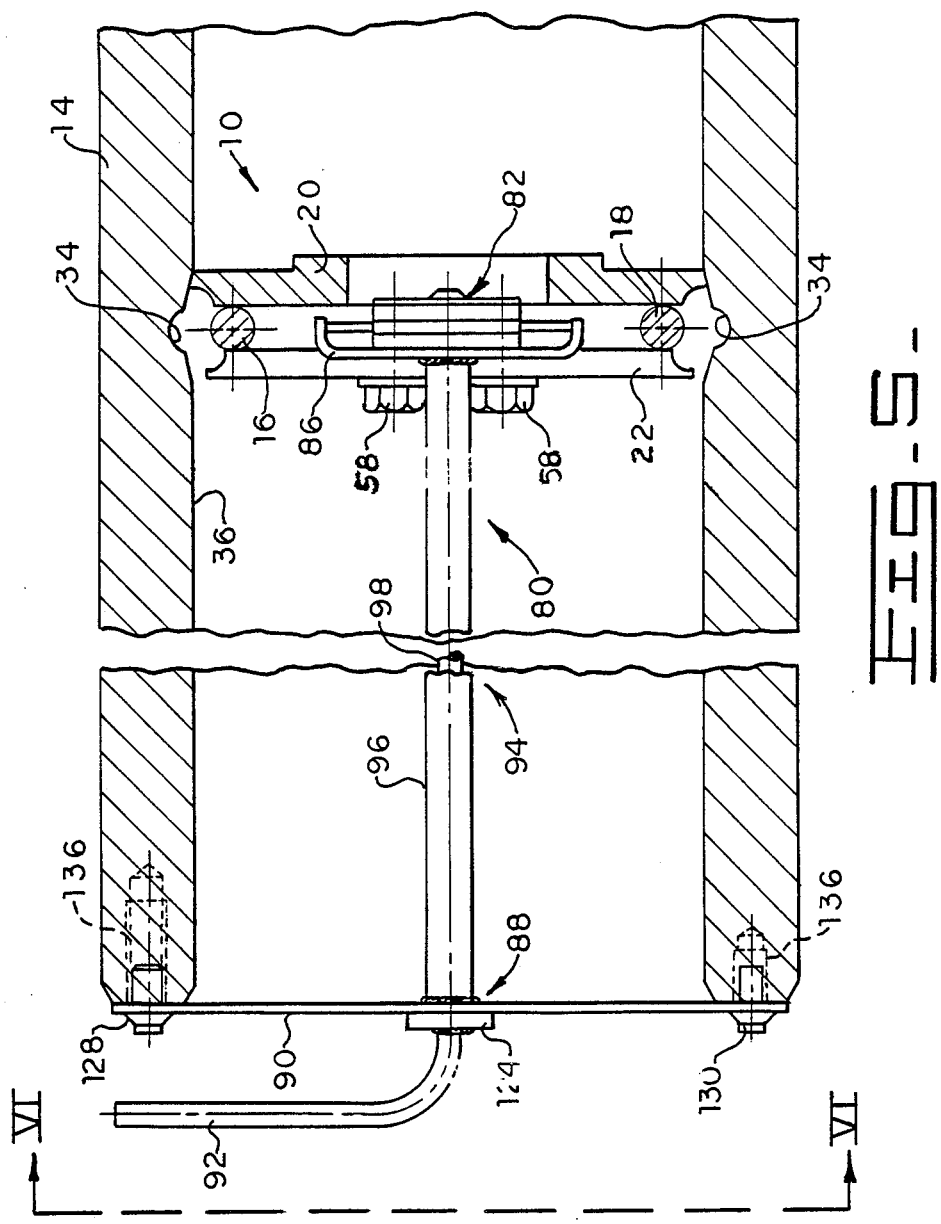

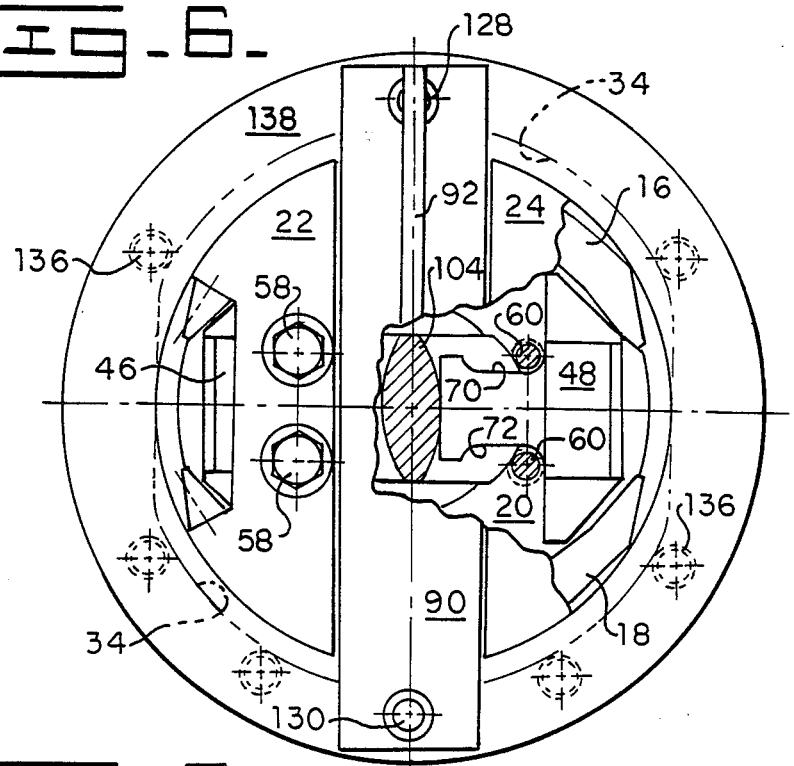
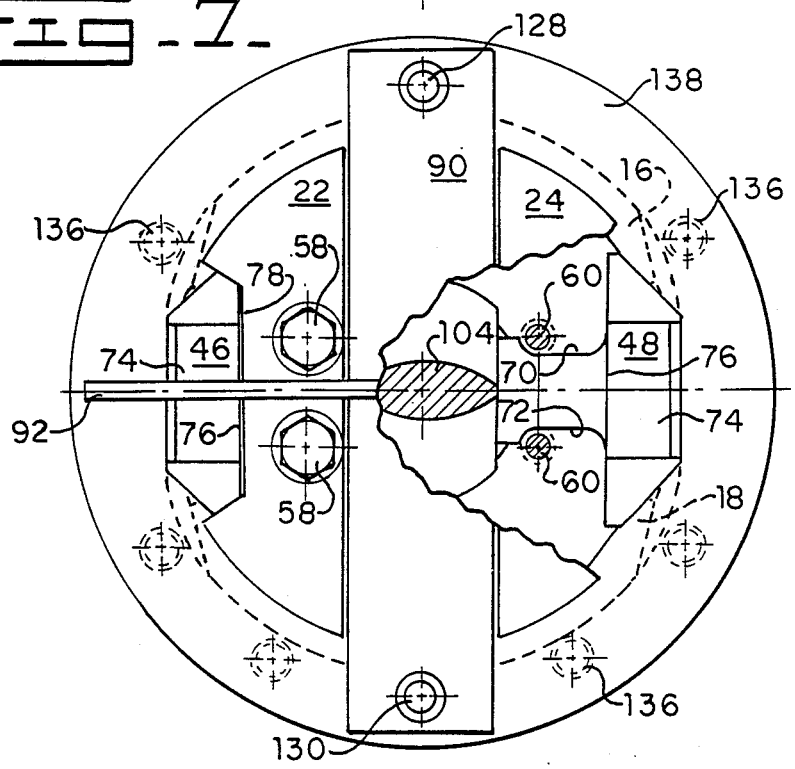

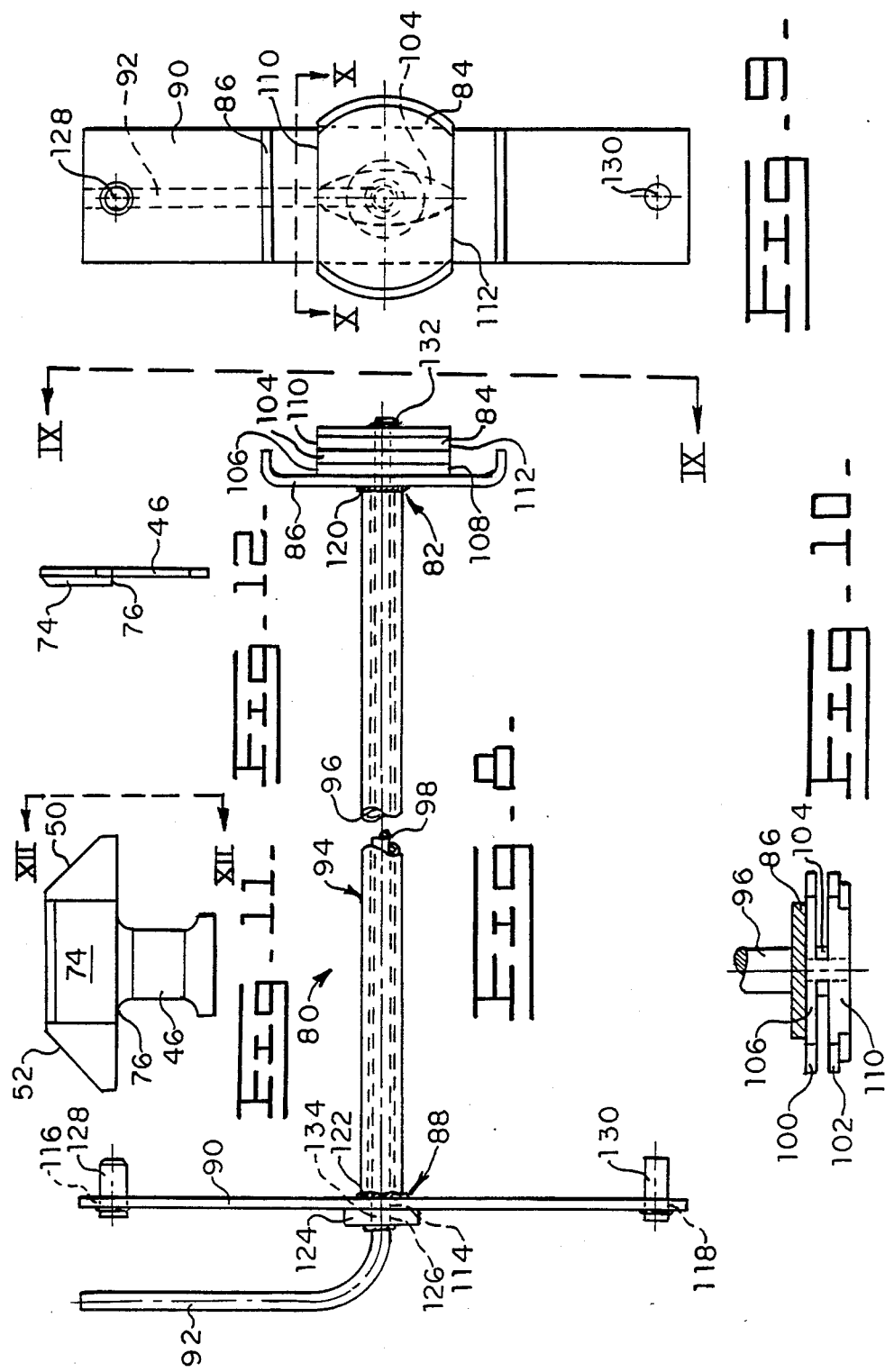

PISTON STOP ASSEMBLY

DESCRIPTION

1. Technical Field

This invention relates generally to a piston stop assembly for a two chamber cylinder and more particularly to a stop assembly which stops and retains a floating piston within the central portion of a hydropneumatic cylinder.

2. Background Art

Many conventional suspension struts and recoil cylinders for various types of transporting and earthmoving vehicles utilize a two-part cylindrical member with a floating or free-moving piston within the cylinder. The floating piston separates the cylinder into two distinct chambers and generally serves to seal one chamber from the other. Conventionally, one of the chambers is filled with a compressible gas and the other chamber is filled with a non-compressible fluid.

One such two-chamber cylinder, with a floating piston separating the two chambers, is disclosed in U.S. Pat. No. 3,343,832 issued on Sept. 26, 1967 to A. G. V. Gustafsson. This two-chamber cylinder is utilized in a spring suspension device for absorbing shocks experienced by a running wheel of a vehicle. In this construction, each end of the cylinder must serve as the stop for the piston, and would normally require bleeding off the pressure from both chambers in order to service or disassemble any portion of the cylinder or related components.

Another type of two-chamber cylinder and floating piston arrangement is shown in U.S. Pat. No. 3,792,910 issued on Feb. 19, 1974 to T. J. Kaufman. This cylinder forms a portion of a recoil and track adjusting mechanism for the endless tracks of a crawler-type vehicle. In this construction, the two chambers are actually formed by two distinct housing members which are joined together by flanges and threaded fasteners. Seals are required between the abutting surfaces. One of the housing members has a stepped shoulder formed in the cylindrical bore and this shoulder and the flanged portion of the other housing serve as limiting stops for the floating piston. This arrangement would also normally require bleeding off both pressurized chambers before servicing or disassembly of related components. This arrangement is also quite complicated requiring considerable machining of parts and time consuming assembly of the components. Neither chamber can be pre-charged prior to total assembly of all the components.

The present invention is directed to overcoming one or more of the problems as set forth above.

DISCLOSURE OF THE INVENTION

In one aspect of the invention, an assembly for stopping and retaining a piston within a cylinder includes a groove formed in the internal wall of the cylinder, a plurality of ring segments positioned within the groove, and first and second retainer plates in contact with the ring segments. The assembly further includes first and second actuating keys, which contact portions of each ring segment, and securing means for holding the first and second retainer plates together and for clamping the ring segments between the retainer plates.

In another aspect of the invention, a tool assembly for positioning and installing a piston stop and retainer assembly within the central portion of a cylindrical member includes a first end portion having a manipulating tool and a contact plate, with the tool having first and second circular guide portions and an intermediate cam portion. The tool assembly further includes a second end portion and a central portion, with the second end portion having a generally rectangularly shaped plate member, a manipulating handle, and a plurality of guide pins. The central portion includes a tubular member and a rod extension of the manipulating handle which extends through the tubular member.

In yet another aspect of the invention, there is disclosed a method of installing a piston stop and retainer assembly within a groove in the internal wall of a cylinder. The method includes the use of an installing tool which positions the stop assembly at a predetermined precise location.

BRIEF DESCRIPTION OF THE DRAWINGS

FIG. 3 is a diagrammatic view, partly in section, similar to FIG. 1 with the piston stop assembly of the present invention secured within the cylindrical member;

FIG. 4 is a diagrammatic sectional view taken generally along the lines IV—IV of FIG. 3;

FIG. 5 is a diagrammatic side elevational view, partly in section and similar to FIG. 1 of the installation tool assembly of the present invention prior to activating of the tool and securing the stop assembly within the cylindrical member;

FIG. 6 is a diagrammatic end view, partly in section, taken generally along the lines VI—VI of FIG. 5;

FIG. 7 is a diagrammatic end view, partly in section, similar to FIG. 6 with the installation tool activated to seat the ring segments of the present invention in locked position within the cylindrical member;

FIG. 8 is a diagrammatic side elevational view of a tool assembly of the present invention;

FIG. 9 is a diagrammatic end view taken along the lines IX—IX of FIG. 8;

FIG. 10 is a diagrammatic top plan view, partly in section, and taken generally along the lines X—X of FIG. 9;

FIG. 11 is a diagrammatic plan view of the actuating keys used in the stop assembly of the present invention; and FIG. 12 is a diagrammatic side view of the actuating key of FIG. 11, taken generally along the lines XII—XII of FIG. 11.

BEST MODE FOR CARRYING OUT THE INVENTION

Figures 1, 2:
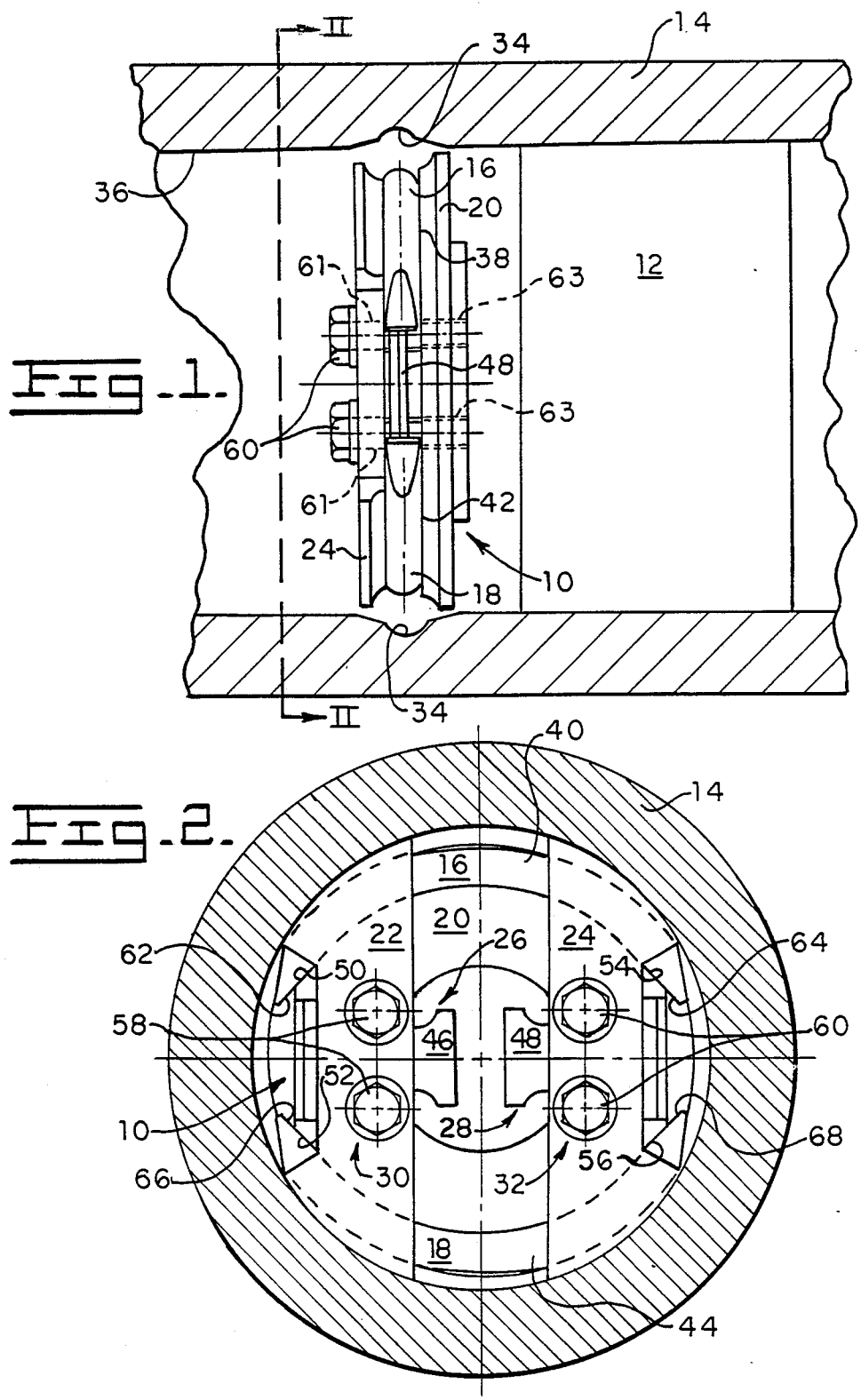
FIG. 1 is a diagrammatic side elevational view, partly in section, of a cylindrical member and piston, and a piston stop assembly of the present invention prior to securing the stop assembly within the cylindrical member.
FIG. 2 is a diagrammatic sectional view taken generally along the lines II—II of FIG. 1.

With reference to the drawings, and in particular FIGS. 1 thru 4, a stop assembly 10 for stopping and retaining a floating piston 12 within a cylinder 14 includes first and second ring segments 16 & 18, a plurality of retainer plates 20, 22, & 24, a plurality of actuating means 26 & 28, and first and second securing means 30 & 32. The cylinder 14 has a groove or channel 34 in the internal wall 36 and the ring segments 16 and 18 are adapted to be positioned within the channel 34. The ring segment 16 has first and second surface portions 38 and 40 and the ring segment 18 has first and second surface portions 42 and 44. In the assembled position of the stop assembly 10, the retainer plate 20 is in contact with the first surface portions 38 and 42 of the ring segments 16 and 18, and the retainer plates 22 and 24 are in contact with the second surface portions 40 and 44. In this position, the ring segments 16 and 18 are sandwiched between the retainer plate 20 on one side and the retainer plates 22 and 24 on the opposite side. In the preferred embodiment, the retainer plates 22 and 24 are of substantially like configuration.

The actuating means 26 and 28 include actuating keys 46 and 48 respectively. The actuating key 46 has a first tapered surface 50 in contact with the ring segment 16 and a second tapered surface 52 in contact with the ring segment 18. The actuating key 48 is similar to the key 46 and has a first tapered surface 54 in contact with the ring segment 16 and a second tapered surface 56 in contact with the ring segment 18. The key 46 is positioned between the plate 20 and the plate 22, and the key 48 is positioned between the plate 20 and the plate 24. The retainer plates 20 and 22 are held together by the first securing means 30, which includes a plurality of threaded fasteners 58. In a similar manner, the retainer plates 20 and 24 are held together by the second securing means 32 which includes a plurality of threaded fasteners 60. The first and second securing means 30 and 32, which also include a plurality of through holes 61 in plates 22 and 24, and a plurality of threaded holes 63 in the retainer plate 20, also serve to clamp the ring segments 16 and 18 between the plates 20, 22 and 24.

Each of the ring segments 16 and 18 has first and second substantially flat surface areas 62 & 64 and 66 & 68 respectively. The tapered surfaces 50 and 52 of the key 46 contact respectively surface areas 62 and 66, and the tapered surfaces 54 and 56 of the key 48 contact respectively surface areas 64 and 68. The keys 46 and 48 are substantially similar and, as shown in FIGS. 6 and 7, each of the keys 46 & 48 has first and second guide portions 70 and 72. The threaded fasteners 58 and 60 cooperate with the guide portion 70 and 72 to guide the keys 46 and 48 during movement of the keys. With particular reference to FIGS. 4, 11 and 12, each of the actuating keys 46 & 48 has a center portion 74 which has a greater thickness than the remainder of the key. This forms a step 76 which cooperates with the edges 78 and 79 on plates 22 and 24 respectively to lock the keys 46 & 48 in place when the stop assembly has been actuated and the threaded fasteners 58 & 60 have been tightened.

With particular reference to FIGS. 5 thru 10, a special tool assembly 80 is provided to precisely position and install the stop assembly 10 within the central portion of the cylinder 14. The tool assembly 80 includes a first end portion 82 having a tool 84 and a contact plate 86, a second end portion 88 having an elongated plate member 90 and a manipulating handle 92, and a central portion 94 having an elongated tubular member 96 and a rod member 98. The tool 84 has first and second circular guide portions 100 and 102, and a cam portion 104 between the two guide portions 100 & 102. Each of the guide portions 100 & 102 has diametrically opposed flat circumferential surfaces 106, 108 and 110, 112 respectively. The cam portion 104 has a circumferential surface area of less magnitude than that of the guide portions 100 & 102.

The plate member 90 is generally rectangular in shape and has a centrally located opening 114 and first and second holes 116 & 118 at opposite ends. The tubular member 96 has a first end 120 secured to the contact plate 86 and a second end 122 secured to the plate member 90. These members are preferably secured together by welding. A circular boss 124, having a centrally located through bore 126, is secured to the manipulating handle 92, preferably by welding, with the through bore 126 in alignment with the opening 114. First and second guide pins 128 & 130 extend through the openings 116 & 118 respectively and are joined by welding to the plate member 90. The rod member 98 extends through the tubular member 96 and has a first end 132 secured, as by welding, to the tool 84 and a second end 134 secured to the handle 92. Preferably, the handle 92 and rod member 98 are formed from a single piece of material.

With particular reference to FIGS. 5, 6, & 7, the tool assembly 80 is shown being utilized to precisely position the stop assembly 10 within the cylinder 14 and, in FIG. 7, to activate portions of the stop assembly 10 to install the stop assembly 10 within the cylinder 14. The cylinder 14 has a plurality of drilled and tapped holes 136 in the end surface 138. These holes 136 are utilized to fasten an end cap (not shown) onto the end of the cylinder 14 for sealing that end of the cylinder 14. At least two of these holes are also used to position and restrain the tool assembly 80 during installation of the stop assembly 10. When the tool assembly 80 and the stop assembly 10 are inserted into the cylinder 14, the guide pins 128 and 130 enter two of the holes 136 and the plate member 90 abuts the end surface 138. With the tool assembly 80 in this position, the stop assembly 10 is precisely located within the cylinder 14 for locking the ring segments 16 and 18 into the channel 34.

INDUSTRIAL APPLICABILITY

With reference to the drawings, the subject piston stop assembly 10 is particularly useful for stopping and retaining a floating piston 12 within the central portion of a hydropneumatic cylinder 14. The piston 12 divides the cylinder into two chambers, one normally charged with a compressible gas, such as nitrogen, and the other chamber charged with an incompressible fluid, such as hydraulic oil. With one end of the cylinder 14 closed and sealed, the piston stop assembly 10, which has been previously mounted upon the tool assembly 80, is inserted by the tool assembly 80 into the other end of the cylinder 14. During mounting of the stop assembly 10 on the tool assembly 80, the fasteners 58 and 60 are loosened, the stop assembly is guided into the tool assembly 80 with the ring segments 16 and 18 moved inwardly, as shown in FIGS. 1, 2 5, and 6. The fasteners 58 and 60 are then tightened and the ring segments are clamped between the first retainer plate 20 and the second and third retainer plates 22 and 24.

As the tool assembly 80 and attached stop assembly 10 are inserted into the open end of the cylinder 14, the guide pins 128 and 130 penetrate two of the holes 136 and the plate 90 contacts the end surface 138. The outside diameter of the plate 20 is just slightly smaller than the inside diameter of the cylinder 14. The stop assembly 10 is now in the proper position to be locked into the cylinder 14. This is accomplished by first loosening the fasteners 58 and 60, which releases the clamping force on the ring segments 16 and 18. The handle 92 of the tool assembly 80 is now rotated to the left approximately 90° as viewed in FIGS. 6 and 7. Since the tool 84, including the cam portion 104, is secured to the handle 92, these elements rotate also. As shown in FIGS. 2 and 6, prior to rotation, the actuating keys 46 and 48 are in contact with the cam portion 104 and with the ring segments 16 and 18, with the keys 46 and 48 in a first retracted position. In this position, the ring segments 16 and 18 are not yet retained within the channel 34.

As the tool 84 and cam portion 104 are rotated, the keys 46 and 48 are moved outwardly to a second extended position. Since the surfaces 50, 52, 54 and 56 of the keys 46 and 48 are in contact with the surface areas 62, 64, 66, and 68, the ring segments 16 and 18 are moved outwardly into the channel 34. The fasteners 58 and 60 are now tightened and the ring segments 16 and 18 are clamped between the plates 20, 22, and 24, as shown in FIGS. 3 & 4. Tightening of the fasteners 58 and 60 also securely clamps the actuating keys 46 and 48 between the retainer plates 20, 22, & 24.

With the ring segments 16 and 18 secured within the channel 34, the stop assembly 10 is locked within the cylinder 14. The tool assembly 80 is now withdrawn from the cylinder 14 and the end cap (not shown) is sealingly secured to the end surface 138 with threaded fasteners engaging the tapped holes 136. However, once the piston stop assembly 10 has been locked in place within the cylinder 14, the chamber to the right of the piston 12, as shown in FIG. 1, can be pressurized. Pressure in this chamber will move the piston against the stop assembly 10, and the stop assembly will retain the piston in this position until a pressure on the other side of the piston 12 moves the piston 12 away from the stop. Although not shown, seals on the piston will prevent leakage from one chamber to the other.

Other aspects, objects and advantages of the present invention can be obtained from a study of the drawings, the disclosure, and the appended claims.

I claim:

1. An assembly for stopping and retaining a piston within a cylinder, said cylinder having a groove in the internal wall, comprising:
   a plurality of ring segments, each segment having first and second surface portions and being positionable within said groove;
   a first retainer plate in contact with said first surface portions of said ring segments;
   a second retainer plate in contact with said second surface portions of said ring segments;
   a first actuating key having first and second tapered surfaces, said first tapered surface being in contact with one of said segments and said second tapered surface being in contact with another of said segments, said first key being positioned between said first and second retainer plates;
   a second actuating key having first and second tapered surfaces, said first tapered surface being in contact with one of said segments and said second tapered surface being in contact with another of said segments; and
   first means for securing said first retainer plate to said second retainer plate and for clamping said ring segments between said first and second retainer plates.

2. The assembly, as set forth in claim 1, including a third retainer plate in contact with said second surface portions of said segments, said second key being positioned between said first and third retainer plates.

3. The assembly, as set forth in claim 1, wherein each of said ring segments has first and second substantially flat surface areas and said tapered surfaces of said actuating keys are in contact with said flat surface areas.

4. The assembly, as set forth in claim 1, wherein each of said actuating keys has first and second guide portions with said securing means cooperating with said guide portions during movement of said actuating keys.

5. The assembly, as set forth in claim 1, including a tool adapted to contact said actuating keys and move said keys from a first unretained position of said ring segments to a second retained position of said ring segments.

6. The assembly, as set forth in claim 5, wherein said tool includes a cam portion.

7. The assembly, as set forth in claim 1, including a third retainer plate and second means for securing said first retainer plate to said third retainer plate.

8. The assembly, as set forth in claim 7, wherein said first actuating key is clamped between said first and second retainer plates and said second actuating key is clamped between said first and third retainer plates.

9. The assembly, as set forth in claim 7, wherein said second and third retainer plates are of substantially like configuration.

10. The assembly, as set forth in claim 7, wherein said first and second securing means includes a plurality of through holes in said second and third retainer plates, a plurality of threaded holes in said first retainer plate, and a plurality of threaded fasteners engaging said holes.

11. A stop assembly for retaining a floating piston within a cylinder, said cylinder having a channel in the internal wall, comprising:
    a plurality of ring segments, each segment being positioned within said channel;
    a plurality of retainer plates in contact with said ring segments;
    a plurality of actuating means, each having a surface in contact with one of said ring segments, at least one of said actuating means being positioned between said first and second retainer plates; and
    first means for securing said retainer plates together and for clamping said ring segments between said retainer plates.

12. The assembly, as set forth in claim 11, wherein each of said actuating means includes an actuating key, each key having first and second tapered surfaces.

13. The assembly, as set forth in claim 12, wherein said first tapered surface of each key is in contact with one of said segments and said second tapered surface of each key is in contact with another of said segments.

* * * * *